Patented June 26, 1923.

1,459,712

UNITED STATES PATENT OFFICE.

RENÉ BAURET, OF PARIS, FRANCE, ASSIGNOR TO LA SOCIÉTÉ DITE: USINES METALLURGIQUES DE LA BASSE-LOIRE, OF PARIS, FRANCE.

PROCESS FOR THE PRODUCTION OF BASIC STEEL.

No Drawing. Application filed May 11, 1921. Serial No. 468,762.

*To all whom it may concern:*

Be it known that I, RENÉ BAURET, citizen of the Republic of France, and resident of Paris, France, post-office address 26$^{bis}$ Rue Alphonse de Neuville, have invented new and useful Processes for the Production of Basic Steel, which improvements are fully set forth in the following specification.

For the practical carrying out of the production of basic steel it is necessary to start with pig iron containing a certain proportion of silicon which must not exceed a certain amount or during the blowing step of the usual process, excessive quantities of the molten metal will be projected from the mouth of the converter.

The present invention consists in certain improvements in the production of steel which enable grey pig iron with a silicon content above the normal, and consequently low in phosphorus, to be treated in the converter without difficulty. This process consists in forming in or introducing into the converter, before the pig iron is added, a highly oxidized liquid bath which contains at the same time a certain amount of lime, or preferably all the lime required for the final operation, and which oxidizes the silicon immediately the grey pig iron is placed in the converter.

The thermal reaction produced by this violent oxidation, acting in conjunction with the immediate formation of a basic slag which neutralizes the silicon, ensures decarburization and avoids the projection of the metal heretofore referred to.

The highly oxidized liquid bath may be produced in various ways without departing from the scope of the invention.

By way of example, the following may be indicated:

A liquid ferruginous slag or a highly oxidized metal bath mixed with the necessary quantity of lime for the production of the desired steel, is prepared in the converter.

The slag may be produced in separate apparatus and may be poured into the converter before the pig iron. A portion (about 15%) of the steel from the previous run may be left in the converter, and this metal may be reblown for some minutes in order to super-oxidize same, the necessary lime having been added beforehand.

A certain amount of the pig iron to be treated may be taken from the ladle and, when poured on to the lime in the converter, is blown for one or two minutes after dephosphorization. The additions of scrap may be made, as usual, before any of the pig iron is introduced.

In the operations conducted according to the process above described the desiliconization of the pig iron, even if very grey, is effected so to speak instantaneously, the hot, large flame appearing at once, whilst projection during the blowing is radically suppressed.

The time spent in the preliminary blowing, for the formation of the slag, is regained by the shortening of the principal operation.

What I claim and desire to secure by Letters Patent is:—

1. The process for the production of basic steel by the treatment in the converter of grey pig iron with a silicon content above the normal, and consequently low in phosphorus, which consists in preparing in the converter before the pig iron is added, a liquid bath comprising oxides and lime, adapted to immediately oxidize the silicon of the pig iron, adding the charge of pig iron and blowing the contents of the converter with an air-blast to complete the conversion.

2. The process for the production of basic steel by the treatment in the converter of grey pig iron with a silicon content above the normal, and consequently low in phosphorus, which consists in introducing into the converter before the pig iron is added, a liquid bath comprising oxides and lime, adapted to immediately oxidize the silicon of the pig iron, adding the charge of pig iron and blowing the contents of the converter with an air-blast to complete the conversion.

3. The process for the production of basic steel by the treatment in the converter of grey pig iron with a silicon content above the normal, and consequently low in phosphorus, which consists in forming in the converter before the pig iron is added, a liquid bath comprising oxides and all the lime required for the final operation, said bath being adapted to immediately oxidize the silicon of the pig iron, adding the charge of pig iron and blowing the contents of the converter with an air-blast to complete the conversion.

4. The process for the production of basic steel by the treatment in the converter of grey pig iron with a silicon content above the normal, and consequently low in phosphorus, which consists in introducing into the converter before the pig iron is added, a liquid bath comprising oxides and all the lime required for the final operation, said bath being adapted to immediately oxidize the silicon of the pig iron, adding the charge of pig iron and blowing the contents of the converter with an air-blast to complete the conversion.

5. The process for the production of basic steel by the treatment in the converter of grey pig iron with a silicon content above the normal and consequently low in phosphorus, which consists in effecting the decarburization of the iron by forming in the converter before the pig iron is added a liquid bath comprising oxides and lime, adapted at the same time to effect the immediate oxidation of the silicon, adding the charge of pig iron and blowing the contents of the converter with an air-blast to complete the conversion.

6. The process for the production of basic steel by the treatment in the converter of grey pig iron with a silicon content above the normal and consequently low in phosphorus, which consists in effecting the decarburization of the iron by introducing into the converter before the pig iron is added a liquid bath comprising oxides and lime, adapted at the same time to effect the immediate oxidation of the silicon, adding the charge of pig iron and blowing the contents of the converter with an air-blast to complete the conversion.

7. The process for the production of basic steel by the treatment in the converter of grey pig iron with a silicon content above the normal, and consequently low in phosphorus, which consists in preparing in the converter before the pig iron is added, a liquid ferruginous slag, to which lime has been added, said slag being adapted to immediately oxidize the silicon of the pig iron, adding the charge of pig iron and blowing the contents of the converter with an air-blast to complete the conversion.

8. The process for the production of basic steel by the treatment in the converter of grey pig iron with a silicon content above the normal, and consequently low in phosphorus, which consists in introducing into the converter before the pig iron is added, a liquid ferruginous slag to which all the lime required for the final operation has been added said slag being adapted to immediately oxidize the silicon of the pig iron, adding the charge of pig iron and blowing the contents of the converter with an air-blast to complete the conversion.

9. The process for the production of basic steel by the treatment in the converter of grey pig iron with a silicon content above the normal, and consequently low in phosphorus, which consists in preparing in the converter before the pig iron is added, a liquid ferruginous slag containing oxides in solution to which lime has been added said slag being adapted to immediately oxidize the silicon of the pig iron, adding the charge of pig iron and blowing the contents of the converter with an air-blast to complete the conversion.

10. The process for the production of basic steel by the treatment in the converter of grey pig iron with a silicon content above the normal, and consequently low in phosphorus, which consists in adding lime into a converter containing a fraction of the metal of a previous pouring, superoxidizing said metal by further blowing for some minutes, and introducing said gray pig iron into said mixture, adding the charge of pig iron and blowing the contents of the converter with an air-blast to complete the conversion.

In testimony whereof I have signed this specification in the presence of two subscribing witnesses.

RENÉ BAURET.

Witnesses:
 FERNAND DUFOUR,
 CHARLES LÉON LOISEL.